(12) United States Patent
Tiana et al.

(10) Patent No.: US 11,142,340 B1
(45) Date of Patent: Oct. 12, 2021

(54) SYSTEM AND METHOD FOR RADAR SENSING RUNWAY APPROACH AND TAXI LIGHTS

(71) Applicant: Rockwell Collins, Inc., Cedar Rapids, IA (US)

(72) Inventors: Carlo L. Tiana, Portland, OR (US); Robert B. Wood, Beaverton, OR (US); David L. Flanders, Tigard, OR (US); Lu Bai, Lake Oswego, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 467 days.

(21) Appl. No.: 14/715,397

(22) Filed: May 18, 2015

(51) Int. Cl.
*B64F 1/18* (2006.01)
*H01Q 15/18* (2006.01)
*G01S 13/91* (2006.01)
*G01S 13/02* (2006.01)

(52) U.S. Cl.
CPC ............ *B64F 1/18* (2013.01); *G01S 13/0209* (2013.01); *G01S 13/913* (2013.01); *H01Q 15/18* (2013.01)

(58) Field of Classification Search
CPC .................................. B64F 1/18; H01Q 15/18
USPC .............................................................. 342/7
See application file for complete search history.

(56) References Cited

U.S. PATENT DOCUMENTS

| | | | |
|---|---|---|---|
| 2,697,828 A * | 12/1954 | Heintz ................... | H01Q 15/18 342/7 |
| 3,243,816 A * | 3/1966 | Chisholm ............. | G01S 13/913 342/11 |
| 4,210,930 A * | 7/1980 | Henry ................... | G01S 13/785 340/972 |
| 5,208,601 A * | 5/1993 | Hart ........................ | G01S 7/025 342/33 |
| 5,459,468 A * | 10/1995 | Hartal .................... | H01Q 1/366 342/6 |
| 7,192,155 B2 * | 3/2007 | Morrow .................... | B64F 1/20 362/153.1 |
| 7,889,117 B1 | 2/2011 | Woodell et al. | |
| 8,077,078 B1 | 12/2011 | Woodell et al. | |
| 8,576,113 B1 | 11/2013 | Seah et al. | |
| 8,576,131 B2 | 11/2013 | Szopko et al. | |
| 8,643,533 B1 | 2/2014 | Woodell et al. | |
| 8,977,491 B1 | 3/2015 | McCusker et al. | |
| 9,024,805 B1 | 5/2015 | Jinkins et al. | |
| 9,558,674 B2 * | 1/2017 | He ........................ | G08G 5/0021 |
| 2002/0105432 A1 * | 8/2002 | Pederson ............. | B60Q 1/2611 340/815.45 |
| 2010/0149639 A1 * | 6/2010 | Kim ........................ | G02B 5/124 359/530 |

(Continued)

OTHER PUBLICATIONS

U.S. Appl. No. 13/250,798, filed Sep. 30, 2011, Jinkins et al.

(Continued)

*Primary Examiner* — Erin F Heard
*Assistant Examiner* — Helena H Seraydaryan
(74) *Attorney, Agent, or Firm* — Suiter Swantz pc llo

(57) ABSTRACT

An apparatus interfaces with a light stanchion associated with a runway. The apparatus can include a first interface for attaching to the light stanchion, second interface for attaching to runway light, and a radar reflective member. The radar reflective member can be a corner reflector. The radar reflector can be part of set of reflectors arranged in accordance with visual approach slope indications or precision approach path indications.

13 Claims, 8 Drawing Sheets

(56) References Cited

U.S. PATENT DOCUMENTS

2014/0375796 A1* 12/2014 Le Cam ................ G01C 9/06
348/135

OTHER PUBLICATIONS

U.S. Appl. No. 14/301,199, filed Jun. 12, 2014, McCusker et al.
U.S. Appl. No. 14/482,681, filed Sep. 10, 2014, Wood et al.
U.S. Appl. No. 14/536,330, filed Nov. 7, 2014, Jinkins et al.
John Croft, Radar Diversity Rockwell Collins tests radar as a runway-finder, Aviation Week & Space Technology Jan. 15-Feb. 1, 2015, p. 61, AviationWeek.com/awst.
Rockwell Collins WXR-2100 Weather Radar System, http://www.rockwellcollins.com/ecat/at/WXR-2100_PrintFriendly.html, retrieved on May 17, 2006, 9 pages.

* cited by examiner

SYSTEM AND METHOD FOR RADAR SENSING RUNWAY APPROACH AND TAXI LIGHTS

BACKGROUND

The present disclosure relates to sensing terrain features using electromagnetic energy including but not limited to electromagnetic energy associated with an avionic weather radar system.

An aircraft uses a vision system, such as, an enhanced vision system (EVS), to provide imagery to an aircraft crew. The imagery can include an airport terminal area and runway environment when meteorological or lighting conditions prevent a clear natural view of the external surroundings of the aircraft through the windscreen. For example, the EVS may overlay an image of an airport terminal area and runway environment over the pilot's natural unaided view of the external surroundings of the aircraft through the aircraft's cockpit windscreen via a head up display (HUD). Such imagery can improve the situational awareness of the flight crew during instrument approach procedures in low visibility conditions such as fog.

An EVS typically uses either a passive or active sensing system to acquire data used to generate imagery of the airport terminal area and runway environment. A typical passive sensor, such as, a forward looking infrared (MR) camera or visible light spectrum camera, receives electromagnetic energy from the environment and outputs data that may be used by the system to generate video images from the point of view of the camera. The camera is installed in an appropriate position, such as in the nose of an aircraft, so that the pilot can be presented with an appropriately scaled and positioned video image on the HUD having nearly the same point of view as the pilot when viewing the external surroundings of the aircraft through the HUD. However, while passive sensors provide higher quality video imagery, the passive sensors are often unable to identify required visual references in certain low visibility conditions, such as, heavy fog.

Active sensing systems, such as, millimeter wavelength (MMW) (e.g., 94 GHz) and weather radar systems (e.g., X-band or C-band), transmit electromagnetic energy into the environment and receive return electromagnetic energy reflected from the environment. The active sensing system is typically installed in an appropriate position, such as in the nose of an aircraft. Active sensing systems can have difficulty accurately identifying runway structures and positions of those structures.

Thus, there is a need for a system for and method of augmenting the ability of a radar system to sense runway structures. Further, there is a need for systems for and methods of providing low cost runway structures that can be sensed by radar. There is also a need for display systems for and methods of providing images of derived from radar data associated with runway structures. There is still a further need for systems for and methods of providing images of the runway environment derived from weather radar data where such images enable operation below certain specified altitudes during instrument approaches. Further still, there is a need for systems and methods that sense lighting structures using X-band and C-band radar data. Yet further still, there is a need for runway lights that are configured to be sensed by a radar system. Yet further still, there is a need for providing visual approach slope indications (VASI) or precision approach path indications (PAPI) without using lighting.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

In one aspect, embodiments of the inventive concepts disclosed herein are directed to an image processing system for enhanced vision including a processor and memory coupled to the processor. The memory contains program instructions that, when executed, causes the processor to provide radar beams and receive radar returns with improved angular and/or range resolution for sensing runway light structures.

In a further aspect, embodiments of the inventive concepts disclosed herein are directed to an apparatus for interfacing with a light stanchion associated with a runway. The apparatus includes a first interface for attaching to the light stanchion, second interface for attaching to runway light, and a radar reflective member.

In a further aspect, embodiments of the inventive concepts disclosed herein are directed to a method of sensing an approach path. The method includes receiving radar returns from an X-band or C-band airborne weather radar system from a radar reflector associated with an approach lighting system and processing the radar return to determine that the approach path within an angular boundary.

In a further aspect, embodiments of the inventive concepts disclosed herein are directed to a method that provides a real time sensor image. The method includes receiving radar returns from an airborne radar system. The radar returns can be processed to have increased range resolution and angular resolution and are received from reflective material associated with a runway stanchion. The method also includes providing a visual image of the external scene topography based on the radar returns.

In another aspect, embodiments of the inventive concepts disclosed herein are directed to a runway lightning system. The runway lighting system includes radar reflectors arranged to provide reflections for visual approach slope indications or precision approach path indications.

BRIEF DESCRIPTION OF THE DRAWINGS

Implementations of the inventive concepts disclosed herein may be better understood when consideration is given to the following detailed description thereof. Such description makes reference to the annexed drawings, which are not necessarily to scale, and in which some features may be exaggerated and some features may be omitted or may be represented schematically in the interest of clarity. Like reference numerals in the figures may represent and refer to the same or similar element, feature, or function. In the drawings.

DETAILED DESCRIPTION

Figure 1:
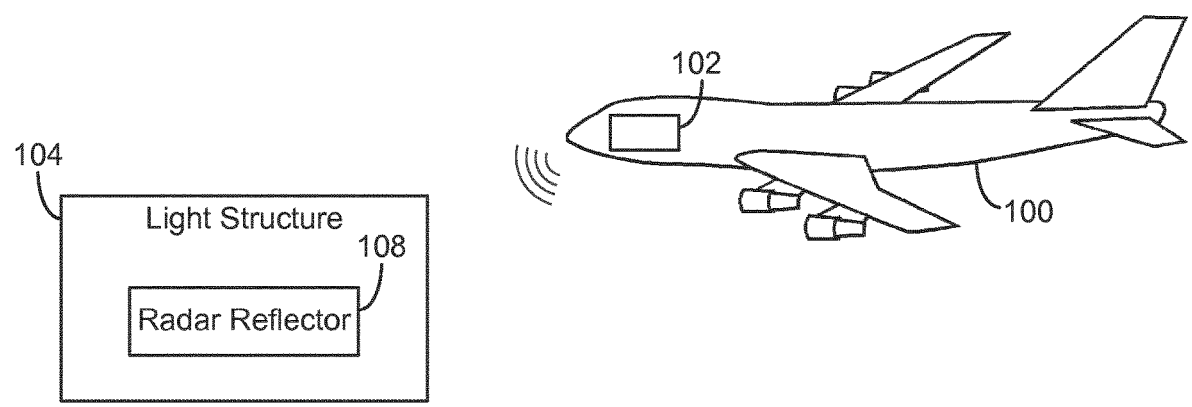
FIG. 1 is a schematic general block diagram of a system for augmenting approach lighting detection according to some embodiments.

Before describing in detail the inventive concepts disclosed herein, it should be observed that the inventive concepts disclosed herein include, but are not limited to, a novel structural combination of components, and not in the particular detailed configurations thereof. Accordingly, the structure, methods, functions, control and arrangement of components, software, and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the exemplary diagrams, but should be construed in accordance with the language in the claims.

According to various exemplary embodiments, an EVS or display system can be provided with radar sensing and imagery displayable to a pilot or co-pilot on an aircraft display, such as an HDD or HUD. For example, the display system may include or use a weather radar system to display an image based upon radar return data. In some embodiments, a Doppler weather radar system may be configured to have enhanced resolution (e.g., angular resolution and/or range resolution). Reflectivity of radar returns from runway structures in an airport terminal or runway environment, such as, an approach lighting system with radar reflectors, a threshold lighting system with radar reflectors, and/or a runway edge lighting system with radar reflectors, can be sensed. As will be appreciated, using a radar system configured according to the various exemplary embodiments provides greater range than passive FLIR or visible light camera systems in low visibility conditions, such as, heavy fog, given radar systems' superior ability to penetrate heavy fog.

Using a radar system such as the weather radar system configured according to the various exemplary embodiments may also provide EVS imagery having sufficient accuracy in low visibility conditions (given that many of the visual references required under Title 14 of the Code of Federal Regulations, part 91, such as, approach lighting systems, threshold lighting systems, runway edge lighting systems, and other runway structures, are metallic structures that exhibit high radar reflectivity). The imagery may allow lower landing minima (e.g., 100 feet or less) in some embodiments.

The display system includes a radar processing component in communication with the radar system and configured to generate image data for display in some embodiments. In some embodiments, the image data is processed to provide a two-dimensional aircraft situation display (e.g., vertical profile display or plan view display) or three dimensional or perspective aircraft situation display image representative of the 3-D positions of runway structures in an airport terminal or runway environment based on the radar returns as described in U.S. patent application Ser. No. 14/301,199, now U.S. Pat. No. 9,384,586 and Ser. No. 14/482,681 now U.S. Pat. No. 9,733,349 incorporated herein by reference in their entireties in some embodiments. In some embodiments, the image data can include visual approach slope indications (VASI) or precision approach path indications (PAPI) even though the lights associated therewith are not visible.

According to certain exemplary embodiments, a radar system, such as, a weather radar system, can be used to detect reflectors attached to runway light structures (e.g., stanchions, conduit, brackets, housings, etc.). Utilizing the high radar cross section associated with the reflectors advantageously allows detection to be achieved whether at day or night, regardless of whether runway lights are on or are off in some embodiments. In certain embodiments, the lighting system may not even exist at an airfield, and only radar-reflecting approach marking structures may be deployed, leading to cost savings for the airfield (no power lines necessary, nor lighting control cabinets, nor the ongoing operating costs of electrical fixtures). In one embodiment, an approach lighting system can be identified from the image generated from the radar data. In certain embodiments, the systems and methods can be utilized as extension to a combined vision system (CVS).

In some embodiments, the radar reflectors are arranged to provide a response for deriving visual approach slope indications or precision approach path indications outputs. The radar reflectors are metal components of any of a variety of shapes in some embodiments and are disposed to reflect radiation from a number of directions. In some embodiments, the reflectors are arranged as corner reflectors, spherical reflectors, ellipsoidal reflectors, parabolic reflectors, or horn reflectors including but not limited to pyramidal horn reflector, sectoral horn reflector, an E-plane horn reflector, an H-plane horn reflector, a conical horn reflector, an exponential horn reflector, a corrugated horn reflector, a ridged horn reflector, a septum horn reflector, and an aperture-limited horn reflector. The specific reflector shape could be chosen to reflect radiation preferentially in certain directions, at certain angles and with a certain distribution, in order to create radar return beam shapes, strengths and directionality mimicking those of lighting beams at airfields. For example, reflections could be formed to provide preferential returns along the airfield's glideslope, or within a cone photometrically comparable to that emitted by current visible spectrum lighting systems.

Referring to FIG. 1, a radar system 102 is provided in an aircraft 100 having an aircraft control center or cockpit. The aircraft control center includes flight displays embodied as head down displays (HDDs). The aircraft control center can also include a combiner associated with a head up display (HUD) system.

According to some embodiments, radar system 102 is configured to provide an image based upon radar data to at least one flight display for viewing by the pilot of aircraft 100. Radar system 102 processes radar return data to detect a radar reflector 108 attached to a light structure 104 associated with a runway (e.g., during approach and/or landing). In some embodiments, the display provides a merged image of terrain derived from two or more of enhanced vision data, radar data, and SVS data as discussed in U.S. application Ser. No. 14/536,330 incorporated herein by reference and assigned to the assignee of the present application. Advantageously, real time radar data can be provide a real time, all weather detection of one or more light structures 104 in some embodiments. Advantageously, the radar data can be processed to identify light structures 104 so that the runway and its orientation can be viewed by one or more pilots in challenging weather conditions in some embodiments.

In some embodiments, the radar reflectivity of light structure 104 is augmented or enhanced by radar reflector 108. Light structure 104 is a bracket, housing, conduit, stanchion, cage, or other structure associated with lighting such as runway lights. Light structure 104 is associated with an approach lighting system, an edge lighting system, centerline lighting system, signage, etc. in some embodiments.

In some embodiments, radar reflector 108 is a metal or other radar reflective component attached to light structure 104 to increase its radar reflectivity in some embodiments. Radar reflector 108 has a rectangular, square, oval, bow tie, or circular cross-section and is relatively planar in some embodiments. In some embodiments, radar reflector 108 has a three dimensional shape (e.g., parabolic, spherical, prismatic, pyramidal, etc.) for directionally reflecting radar beams. In some embodiments, radar reflector 108 is configured for retrofitting to an existing runway light or is integrated with the runway light.

Figures 2, 3, 4:
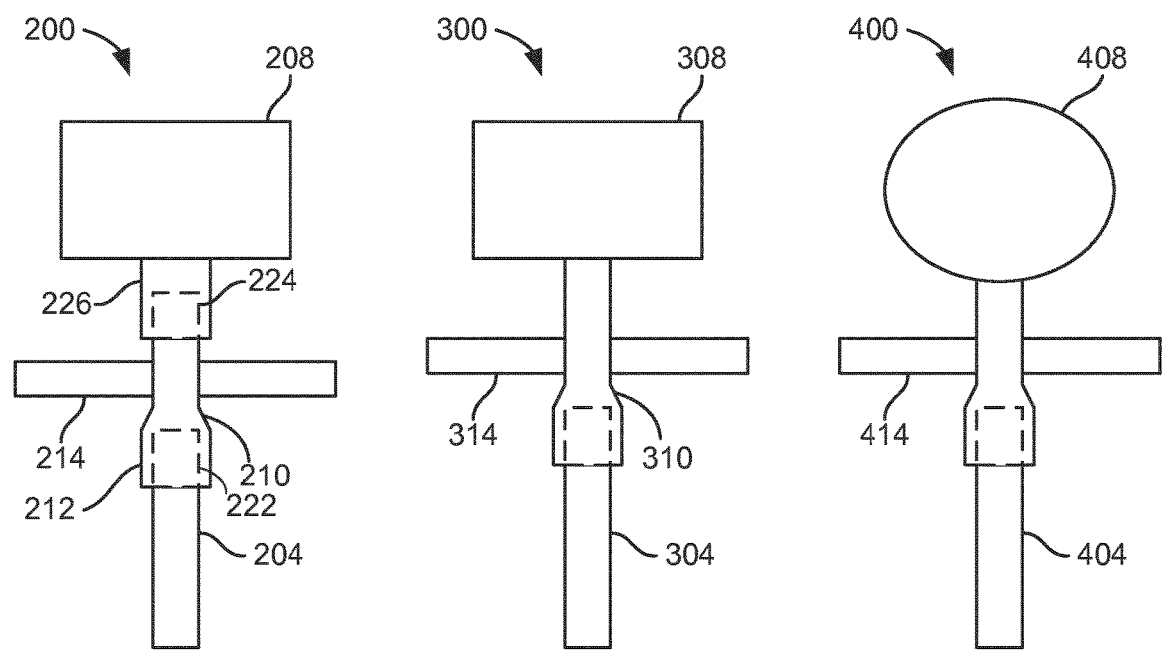
FIG. 2 is a planar side view schematic drawing of a runway light and radar reflector for use in the system illustrated in FIG. 1 according to some embodiments.
FIG. 3 is a planar side view schematic drawing of a runway light and radar reflector for use in the system illustrated in FIG. 1 according to some embodiments.
FIG. 4 is a planar side view schematic drawing of a runway light and radar reflector for use in the system illustrated in FIG. 1 according to some embodiments.

Referring to FIG. 2, a runway light 200 includes a light structure 208, a component 210, and a stanchion 204 in some embodiments. Runway light 200 can be part of a set of runway lights attached to one or more stanchions, such as stanchion 204. Runway light 200 can be any of a variety of types of lighting associated with an airport and can have bulbs, lenses, shields and housings of various shapes and sizes. Stanchion 204 can be electrical conduit, housing, bracket, or a post for runway light 200 in some embodiments. Component 210 includes a radar reflector 214 similar to radar reflector 108 discussed with reference to FIG. 1. In some embodiments, radar reflector 108 is a stand-alone element and not attached to existing infrastructure.

Component 210 includes a collar 212 configured to fit over an end 222 of stanchion 204. Collar 212 can be glued, fastened, welded, or otherwise attached to stanchion 204. Component 210 also includes an end 224 for fitting within a collar 226 of light structure 208. End 224 can be glued, fastened, welded, or otherwise attached to light structure 208. In some embodiments, ends 222 and 224 slideably engage collars 212 and 226, respectively, and are fastened to respective ends 22 and 224 by a set screw.

In some embodiments, component 210 is configured for retrofitting to an existing light structure 208. In some embodiments, component 210 includes two pieces (e.g., semicircular in cross section) which can be attached to each other around existing wiring between stanchion 204 and light structure 208 so runway light 200 does not have to be rewired when component 210 is installed. In some embodiments, end 224 of component 210 can fit over collar 226. In some embodiments, collar 212 of component 210 can fit within end 222 of stanchion 204.

Radar reflector 214 can have a variety of shapes. In some embodiments, radar reflector 214 is a plate, such as a 2 inch by 4 inch by ⅜ inch metal plate. In some embodiments, radar reflector 214 has a volumetric shape (e.g., horn reflector, spherical, parabolic reflector, pyramidal reflector, etc.). Radar reflector 214 can be angled in the vertical plane (e.g., 0-10 degrees, 2-5 degrees, 3 degrees) to provide reflections to aircraft 100 (FIG. 1) at approach or landing slopes in some embodiments.

In some embodiments, radar reflector 214 is shaped such that radar returns are proportional to the location of radar system 102. Radar reflector 214 is shaped according to current PAPI or VASI standard approach lights that have visual angular dependence in some embodiments. In some embodiments, radar reflector 214 and other reflectors in a set of reflectors are themselves shapes to provide this PAPI or VASI response without extraction or derivation being required by radar system 102.

Referring to FIG. 3, a runway light 300 includes a light structure 308 and a stanchion 304 in some embodiments. Stanchion 304 can similar to stanchion 204 (FIG. 2) in some embodiments. Runway light 300 includes a radar reflector 314 similar to radar reflector 108 discussed with reference to FIG. 1. Radar reflector 314 can be integrated with light structure 308 in some embodiments. Light structure 308 includes a collar 310 configured to fit over stanchion 304.

Referring to FIG. 4, a runway light 400 includes a light structure 408 and a stanchion 404 in some embodiments. Runway light 400 can be a directional runway light in some embodiments. Stanchion 404 can similar to stanchion 204 (FIG. 2) in some embodiments. Runway light 400 includes a radar reflector 414 similar to radar reflector 108 discussed with reference to FIG. 1. Radar reflector 414 is integrated with light structure 408 or is attached using a component similar to component 210 (FIG. 2) in some embodiments.

Figure 5:
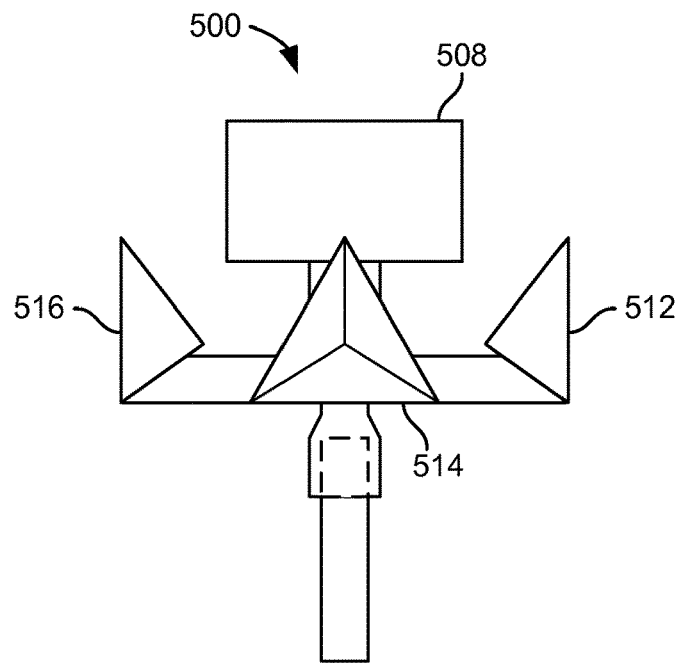
FIG. 5 is a planar side view schematic drawing of a runway light and radar reflectors for use in the system illustrated in FIG. 1 according to some embodiments.
Figure 6:
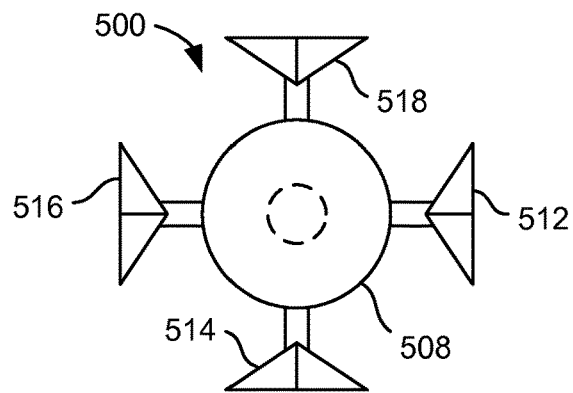
FIG. 6 is a planar top view schematic drawing of the runway light and radar reflectors

Referring to FIGS. 5 and 6, a runway light 500 includes a light structure 508 and a stanchion 404 in some embodiments. Stanchion 504 can similar to stanchion 204 (FIG. 2) in some embodiments. Runway light 500 includes a set of radar reflectors 512, 514, 516, and 518 similar to radar reflector 108 discussed with reference to FIG. 1. Radar reflectors 512, 514, 516, and 518 can be integrated with light structure 508 in some embodiments or attached using an element similar to component 210 (FIG. 2).

Radar reflectors 512, 514, 516, and 518 are corner reflectors made from a suitable radio reflective material in some embodiments. In some embodiments, radar reflectors 512, 514, 516, and 518 are made from a metal, such as, aluminum. Radar reflectors 512, 514, 516, and 518 are provided at the runway in some embodiments. In some embodiment, radar reflectors 512, 514, 516, and 518 have a pyramidal or triangular shape. In some embodiments, radar reflectors 512, 514, 516, and 518 are open faced pyramidal/triangular systems configured so that a beam that strikes one of radar reflectors 512, 514, 516, and 518 bounces directly back to radar system 102 (FIG. 1) over a large range of incident angles. Radar reflectors 512, 514, 516, and 518 can be sized differently so that each radar reflector 512, 514, 516, and 518 can be identified. For example, a north facing reflector can have twice the radar cross section from a west facing reflector so that reflections from each can be distinguished by return power level.

Figure 7:
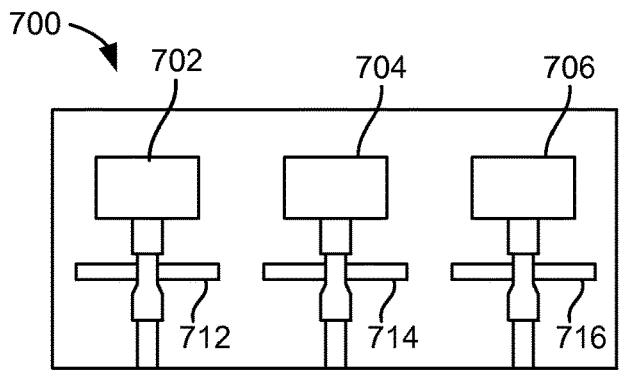
FIG. 7 is a front view schematic drawing of an approach lighting system with radar reflectors for use in the system illustrated in FIG. 1 according to some embodiments.

Referring to FIG. 7, an approach lighting system 700 includes runway lights 702, 704, and 706. Lights 702, 704, and 706 can be similar to lights 200, 300, 400, or 500 and include respective radar reflectors 712, 714, and 716.

In some embodiments, reflectors 712, 714, and 716 are configured to provide visual approach slope indications or precision approach path indications. Radar reflectors 712, 714, and 716 can be positioned and oriented to provide radar reflections when aircraft 100 is in the proper glide slope (e.g., 2.8-3.2 degrees, or 2.5-3.5 degrees). In some embodiments, radar system 102 provides a vertical scan and determines a maximum reflection from radar reflectors 712, 714, and 716. When the maximum reflection is at a tilt angle corresponding to a proper glide slope, radar system 102 provides a proper visual approach slope indications or precision approach path indications. Advantageously, reflectors 712, 714, and 716 can be attached to an existing approach landing system for providing non-lighting-based visual approach slope indications or precision approach path indications.

In some embodiments, radar reflectors having different sizes are configured as follows: one size having maximum reflection at less than 2.8 degree glide slope, one size having maximum reflection greater than 3.2 degree glide slope, and one size having maximum reflection between a 2.8 and 3.2 glide slope. Radar system 102 can process the returns from such radar reflectors and provide visual approach slope indications or precision approach path indications according to which reflections are sensed. U.S. Pat. No. 8,576,113 incorporated herein by reference discusses size-based sensing of radar reflectors. In some embodiments, radar reflectors having different sizes are configured as follows: one size having maximum reflection at less than 2.5 degree glide slope, one size having maximum reflection greater than 3.5 degree glide slope, one size having maximum reflection between a 2.5 and 2.8 glide slope, one size having maximum reflection between 3.2 and 3.5 degree glide slope, and one size having maximum reflection between a 2.8 and 3.2 glide slope.

Figure 8:
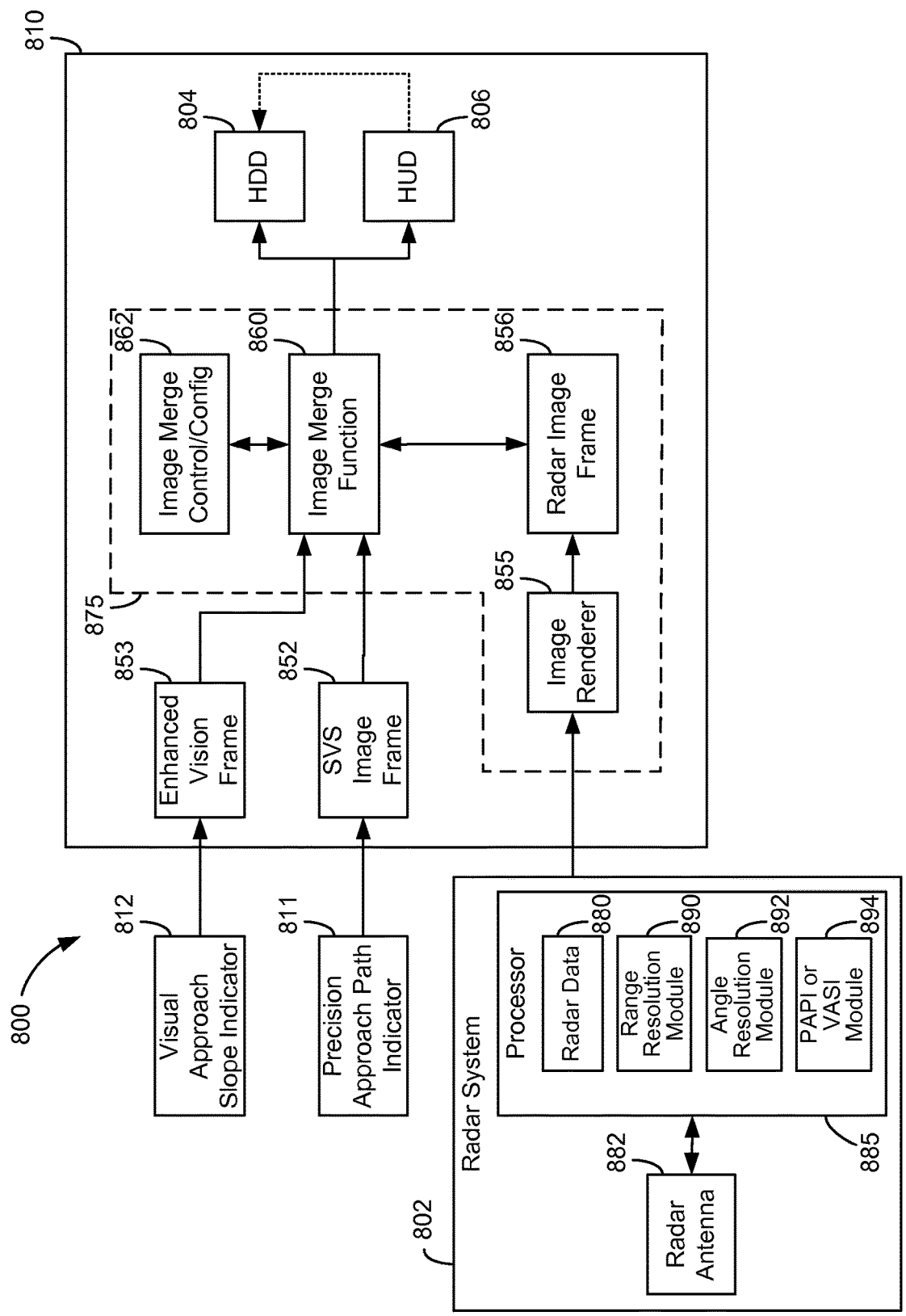
FIG. 8 is a general block diagram of a system for sensing runway lights according to some exemplary embodiments.

With reference to FIG. 8, a display system 800 can be utilized for providing an image to head down display 804 or head up display 806. Display system 800 is in communication with or includes a radar system 802 (e.g., similar to radar system 102 (FIG. 1)), a synthetic vision system (SVS) 811 and an enhanced vision system (EVS) 812. EVS 812 and the SVS 811 are optional in some embodiments. Display system 800 includes a memory 853 for storing enhanced vision frame from the EVS 812, a memory 852 for storing enhanced vision frame from the SVS 811, an image renderer 855, a memory 856 for storing the radar image from the image renderer 855, an image merge function component 860, and an image merge control/configuration component 862.

Image renderer 855, image merge component 860, and the image merge control/configuration component 862 can be embodied as software modules operating on a computing platform or a processor 875 and can be stored on a non-transitory medium. Processor 875 can be part of or integrated with radar system 802, SVS 811, EVS 812, or displays 802 and 804 in some embodiments. In some embodiments, processor 875 is an independent platform.

Radar system 802 is a weather or other radar system generally located inside the nose of the aircraft, inside a cockpit of the aircraft, on the top of the aircraft or on the tail of the aircraft in some embodiments. Radar system 102 can include a radar data storage unit 880, a radar antenna 882 and a processor 885. Radar system 802 can be a weather radar system, such as, a Multiscan™ radar system from Rockwell Collins, Inc. configured as described herein. The radar system 802 can utilize a split, half or sub-aperture or other technique for obtaining radar data associated with external surroundings in some embodiments. Radar system 802 can use the split or sub-aperture techniques of the radar systems described in U.S. application Ser. No. 13/627,788, now U.S. Pat. No. 9,024,805, Ser. No. 12/892,563, now U.S. Pat. No. 8,643,533, Ser. No. 13/250,798, now U.S. Pat. No. 9,562,788, Ser. No. 12/236,464, now U.S. Pat. No. 8,977, 491, and Ser. No. 12/167,200, now U.S. Pat. Nos. 7,889,117 and 8,077,078, incorporated herein by reference and assigned to the assignee of the present application. The type of the radar system 802 and data gathering techniques are not discussed in the specification in a limiting fashion.

Processor 885 receives radar returns (e.g., weather radar returns data) from the radar antenna 882, processes the radar returns and provides the radar data in radar data storage unit 880. In some embodiments, the data stored in radar data storage unit 880 can be stored as an image frame representing the data from a radar scan of the external surroundings (e.g., a runway environment).

The radar data associated with the external surroundings can represent detected targets and the location of the detected targets. Targets include terrain, man-made features, objects, runways, radar reflectors 108, etc. Improved angular resolution and range resolution techniques allow the location of the targets to be more accurately determined and represented in image data in some embodiments. Radar system 802 scans the external surroundings in front of aircraft 100 aircraft to sense the location of targets (e.g., radar reflectors 108). Radar system 802 can utilize clutter suppression and Doppler filtering to improve performance in some embodiments.

Radar system 802 includes radar data memory 880, a range resolution component 890, an angle resolution component 892, and visual approach slope indication or precision approach path indication component 894 in some embodiments. Range resolution component 890, angle resolution component 892, and visual approach slope indication or precision approach path indication component 894 are optional and conventional radar processing can be utilized to obtain and display returns from reflectors 108 and to provide VASI and PAPI indications as described below.

Range resolution component 190 advantageously increases the range resolution of the radar system 802 when compared to alternative radar sensing operations, for example, weather or wind shear sensing, in some embodiments. Angle resolution component 890 advantageously increases the angle resolution of radar system 802 when compared to alternative radar sensing operations in some embodiments. Component 894 processes the radar data to provide visual approach slope indications or precision approach path indications based upon returns received from radar reflectors 702, 704, and 706 (FIG. 7) in some embodiments. In some embodiments, processing of radar return data from component 894 leads to a representation of the radar-sensed PAPI or VASI structures similar to the representation currently sensed by pilots using natural vision. The increased resolution in range and angle allows a higher resolution image to be provided on the displays 802 and 804 in some embodiments. Range resolution component 890, angle resolution component 892, and component 894 can be software modules executed by the processor 885.

According to some embodiments, radar system 802 under control of the angle resolution component 892 can use a beam sharpening method to achieve increased angular resolution. In some embodiments, radar system 802 can utilize techniques such as beam sharpening (e.g., horizontal beam sharpening) and de-convolution of the beam point spread function for improved angular resolution. In some embodiments, radar system 802 can use beam sharpening as a process that improves the antenna-induced poor angular resolution (e.g., due to the beam width). There are many methods that can be used such as: Doppler Beam Sharpening, Synthetic Aperture Radar (SAR), Monopulse Radar, Sub-Aperture Radar or Split-Aperture Radar, etc. Mathematical methods, such as but not limited to centroid detection techniques and blob analysis, can be utilized to determine a center or centroid of specific radar echoes for identifying runway features or specific reflector locations. Techniques for beam sharpening are discussed in U.S. patent application Ser. No. 13/627,788, now U.S. Pat. No. 9,024,805, Ser. No. 12/892,563, now U.S. Pat. No. 8,643,533, Ser. No. 13/250,798, now U.S. Pat. No. 9,562,788, Ser. No. 12/236,464, now U.S. Pat. No. 8,977,491, and Ser. No. 12/167,200, now U.S. Pat. Nos. 7,889,117 and 8,077,078 incorporated herein by reference in their entireties.

Radar system 802 can use radar antenna 882 configured as a switched aperture antenna for beam sharpening. Radar system 802 can also be configured for sequential lobing or monopulse operation to accurately estimate at which angle the target was located within the radar beam. In some embodiments, the radar beams provided by radar antenna 882 and returns received by radar antenna 882 associated with radar system 802 can be separated into two or more portions and can be used to determine an angle from radar antenna 882 to a target or a vector from the radar antenna 882 to a target such as a runway feature. The vector can be represented as an angle (bore site angle) and range to the target. Various processes can be utilized to calculate the angle or vector to the target.

Radar system 802 uses radar antenna 882 that toggles between transmitting and receiving on the full aperture and transmitting on the full aperture while receiving on the partial aperture in some embodiments. These techniques can be used to accurately estimate at which angle the target was located within the radar beam and can be used to improve the accuracy of the Doppler calculations correcting for those angles. The received returns can be processed to determine a high resolution estimate of a target angle relative to the bore site of the antenna beam. According to some embodiments, the returns can be processed using a complex conjugate multiplication method to determine the target angle. The processing can be related to sequential lobing processing but is executed in the phase domain as opposed to the common amplitude domain in some embodiments.

In some embodiments, radar system 802 uses sequential lobing techniques where two antennas that are close to the same place may be used, going back and forth between the two antennas. An amplitude signature or phase signature that varies between the two halves of the antennas may be used to obtain data about target position for detected targets (e.g., an object such as other aircraft, terrain, towers, runway lights, and runway lights including radar reflectors such as radar reflector 108). Sequential lobing generally does not use phase comparisons with moving targets due to Doppler-induced phase changes that contaminate the phase center measurement. However, using a complex conjugate multiply method allows the Doppler-induced phase changes to be removed by cancellation. Therefore, a change in phase center between multiple different sub-apertures may be determined and used to determine angle to target.

In some embodiments, range resolution component 890 provides higher resolution by increasing the effective waveform bandwidth of the radar system 802. Range resolution component 890 can use stepped-frequency compression in some embodiments. To provide higher range resolution, range resolution component 892 can control radar system 802 to provide ultra-wideband radar (UWB) beams (e.g., extremely narrow pulses with high power), or to provide intra pulse compression (frequency of phase modulation of the transmitted pulse) in some embodiments. Frequency coding techniques including the common linear frequency modulation (LFM) or chirp method, and discrete coded segments within the pulse can be utilized in some embodiments. Phase coding techniques including binary phase codes as well as various polyphase codes can be utilized in some embodiments. To provide higher range resolution, range resolution component 892 can control the radar system 802 to provide interpulse pulse compression or stepped frequency compression (e.g., successive pulses with discrete increasing frequency steps) in some embodiments. In some embodiments, stepped frequency compression advantageously achieves high effective bandwidth with narrow instantaneous bandwidth. The receive bandwidth is smaller, has lower noise bandwidth, and a higher signal to noise ratio in some embodiments. Analog-to-digital sampling rates are lower (vs. pulse-compression) in some embodiments. In addition, the stepped frequency compression also has a smaller peak power (e.g., when compared to impulse), provides flexible transmit frequency control, can "hop" over restricted or undesired transmit frequencies, enables adaptive/cognitive frequency use, and rejects later received clutter from earlier transmit pulses in some embodiments. Further, the stepped frequency compression provides returns from clutter in ambiguous ranges that have frequencies that are different from returns from targets and rejects ambiguous clutter returns in the receiver IF filter of the radar system 802 in some embodiments. Stepped frequency compression generally does not achieve range resolution with a single pulse, requires transmit, receive and processing of a group of pulses for any one bin, and has more pronounced range-Doppler coupling (e.g., different Doppler shifts for each frequency) in some embodiments.

According to one embodiment, SVS 811 can be any electronic system or device for providing a computer generated image of the external scene topography. The image can be from the perspective of the aircraft flight deck as derived from aircraft attitude, high-precision navigation solutions, and a database of terrain, obstacles and runway features. Generally, only those terrain, obstacle, and runway features which are contained in the current version of the SVS database are displayed in a conventional system. In some embodiments, the pilot uses the synthetic vision images as enhancements to available visual cues.

According to some embodiments, EVS 812 can be any electronic system or device for providing a sensed image of the external scene topography. EVS 112 can be an infrared camera in one embodiment.

In some embodiments, display system 800 combines or fuses SVS 811 and/or the EVS 812 with the image derived from radar data from the radar system 802 to provide an overall image provided to the pilot according to one embodiment. In some embodiment, the image derived from the radar data are fused with HUD symbology for the displays 802 and 804.

Processors 875 and 885 can be any hardware and/or software processor or processing architecture capable of executing instructions and operating on navigational and radar data. Image merge control configuration component 862 can provide format adjustments to data.

In some embodiments, a set of reflectors 108 are shaped to produce particular return shapes, independent of radar processing by radar system 802. Radar system 802 can provide a pulse and receive a variable return from the set of reflectors 108 in some embodiments. The set of reflectors 108 are appropriately combined into an array or shaped to produce reflections that had angular dependence to mimic current lighting systems, which have preferential directions of illumination (e.g., the VASI and PAPI lights) in some embodiments. For example, zero or up to 4 received reflections depending on position relative to the glideslope angle can be received based upon a central, higher intensity portion of the radar return as very directed beam from reflector 108, so that radar system 802 only detects the return if radar system 802 is lined up for approach on the proper runway.

Figure 9:
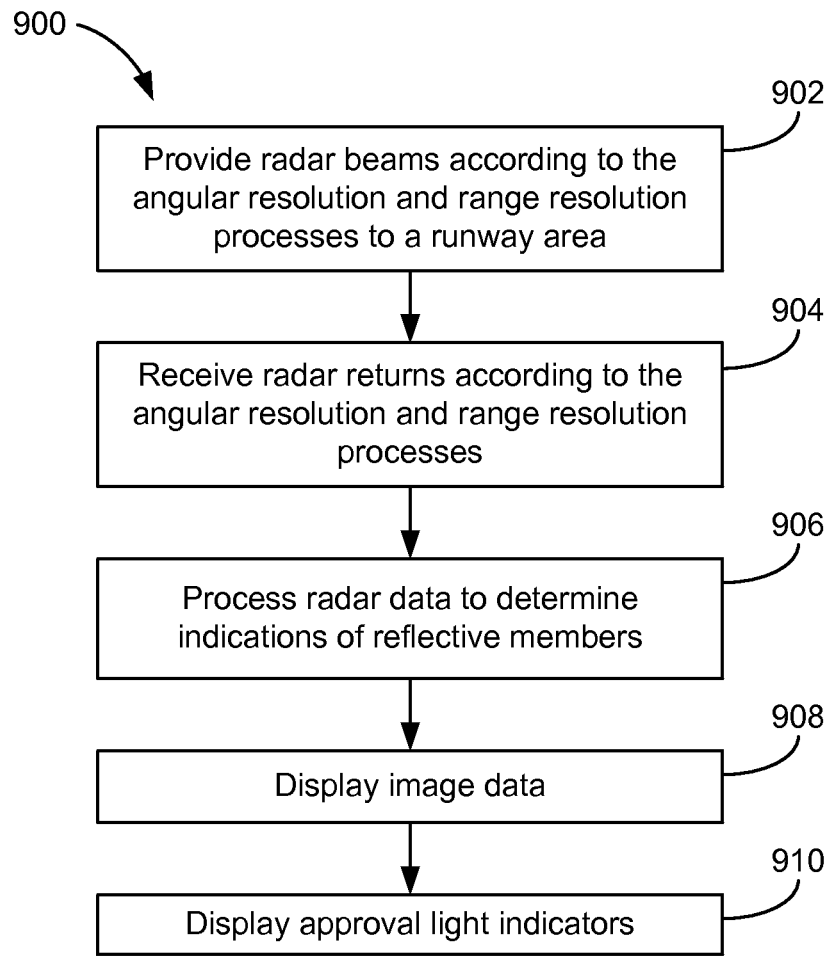
FIG. 9 is a flow diagram showing an exemplary process used by the system illustrated in FIG. 8 according to some embodiments.

With reference to FIG. 9, a flow 900 can be performed by radar system 802 and display system 800 in some embodiments. At an operation 802, weather radar system 802 provides a radar scan comprised of multiple radar beams directed to a runway during approach or landing in some embodiments. In some embodiments, the radar beam for the visual approach slope indications or precision approach path indications is provided at the slope angle. The radar beams are provided according to beam sharpening techniques and stepped frequency compression techniques in a way to increase the angular and range resolution in some embodiments. At an operation 904, radar returns are received according to the beam sharpening techniques and stepped frequency compression techniques to increase the angular and range resolution in some embodiments. The radar returns include returns from radar reflectors 108, such as radar reflectors 712, 714, and 716. The radar returns from radar reflectors 108 can be detected due to their energy level.

At an operation 906, the radar returns are processed to obtain image data and to obtain locations of radar reflectors 108 in some embodiments. Processor 885 or 875 can compare locations of radar reflectors 108 to locations in a data base for the runway to verify accuracy. In some embodiments, processor 885 or 875 receive data form a data base indicating whether radar reflectors 108 are configured for visual approach slope indications or precision approach path indications before processing radar data for such indications. Data for glide slop indications can be derived based upon tilt angle of antenna 882, pitch of aircraft 100, and power returned form reflectors 108. In some embodiments, a vertical scan is performed to determine a return power versus beam angle profile to determine the glide slope. At an operation 908, the image data is merged with other image data, such as overlay symbology or sources of SVS or other EVS images. Operation 908 is optional.

At an operation 910, the image associated with the image data is displayed on displays 802 and 802 and visual approach slope indications or precision approach path indications are provided to displays 802 and 804. After operation 910, flow 900 returns to operation 902 in some embodiments. Operation 910 is optional in some embodiments.

Figure 11:
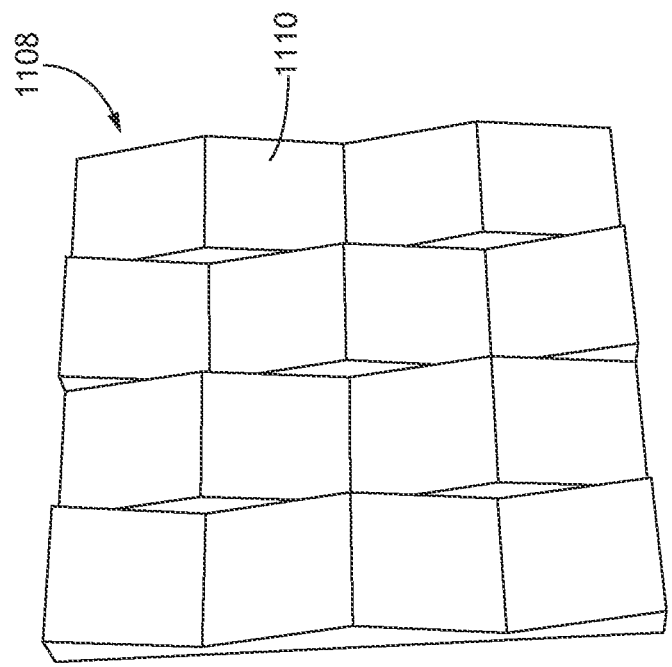
FIG. 11 is a perspective view schematic drawing of a radar reflector for use in the system illustrated in FIG. 1 according to some embodiments.
Figure 10:
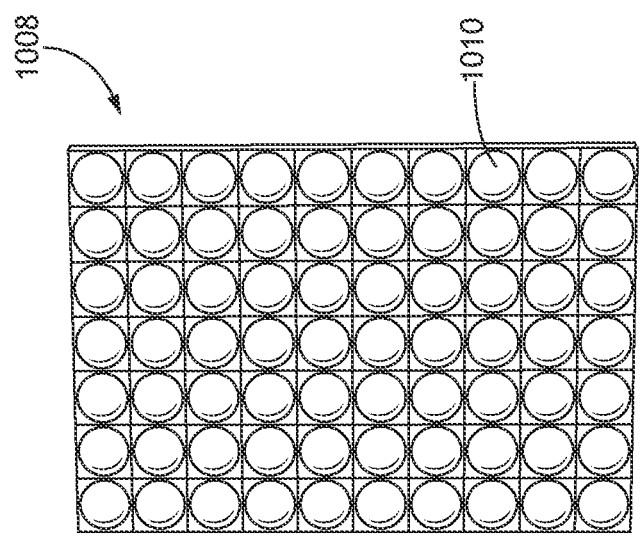
FIG. 10 is a planar top view schematic drawing of a radar reflector for use in the system illustrated in FIG. 1 according to some embodiments.
Figure 13:
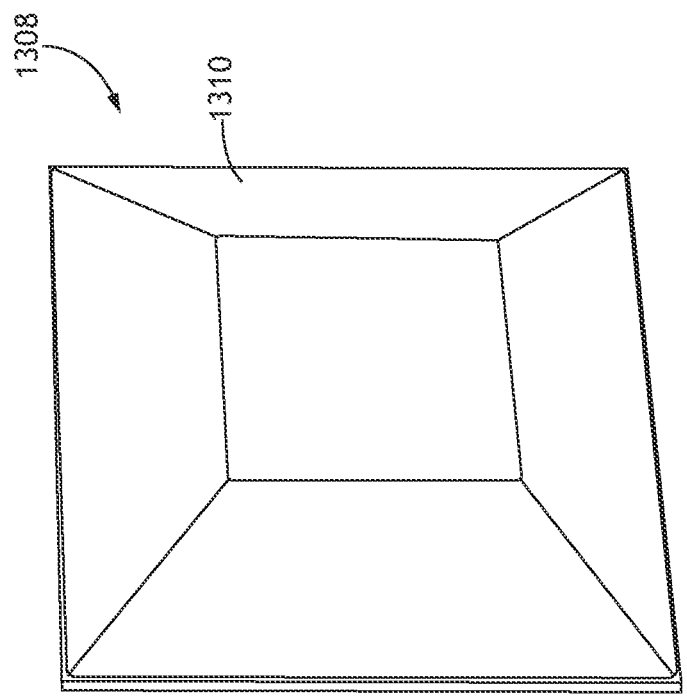
FIG. 13 is a perspective view schematic drawing of a radar reflector for use in the system illustrated in FIG. 1 according to some embodiments.
Figure 12:
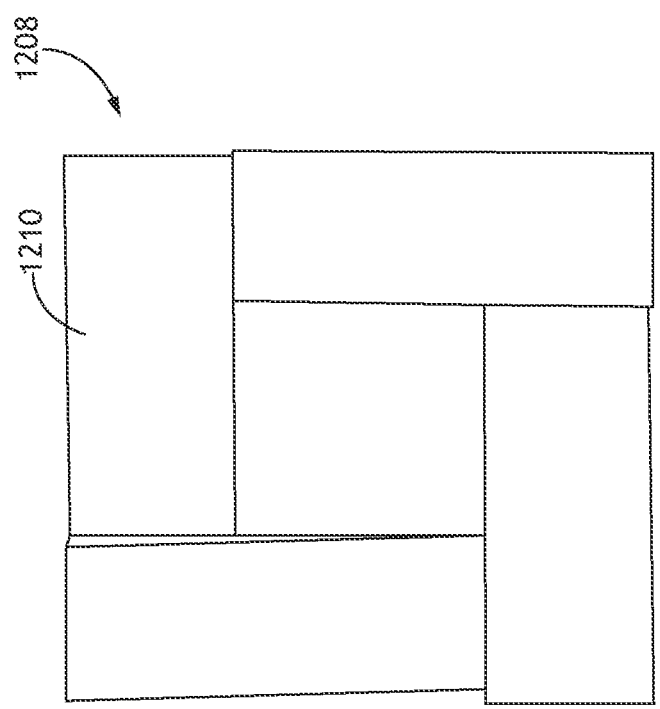
FIG. 12 is a perspective view schematic drawing of a radar reflector for use in the system illustrated in FIG. 1 according to some embodiments.
Figure 15:
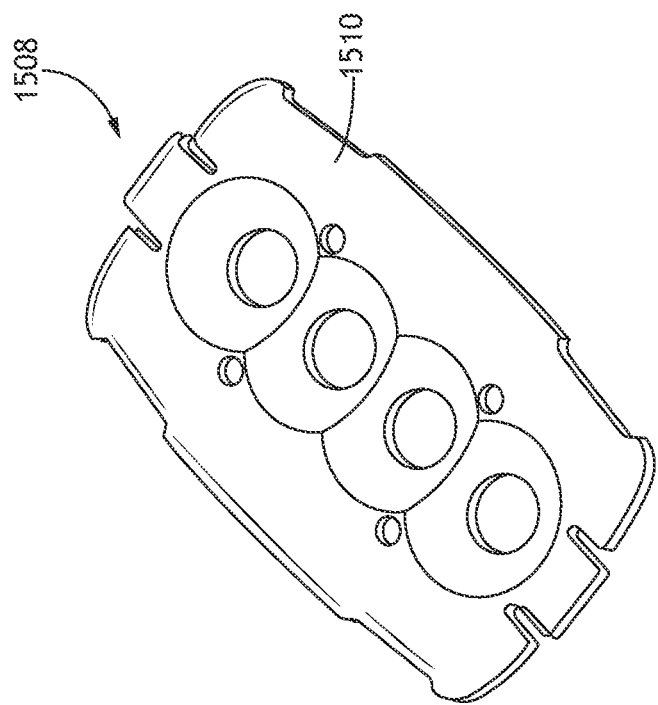
FIG. 15 is a perspective view schematic drawing of a radar reflector for use in the system illustrated in FIG. 1 according to some embodiments.
Figure 14:
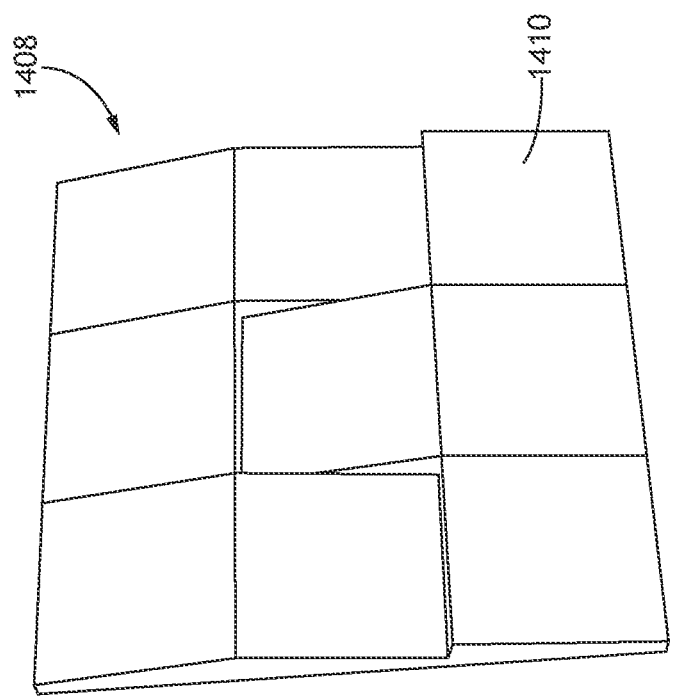
FIG. 14 is a perspective view schematic drawing of a radar reflector for use in the system illustrated in FIG. 1 according to some embodiments.
Figure 17:
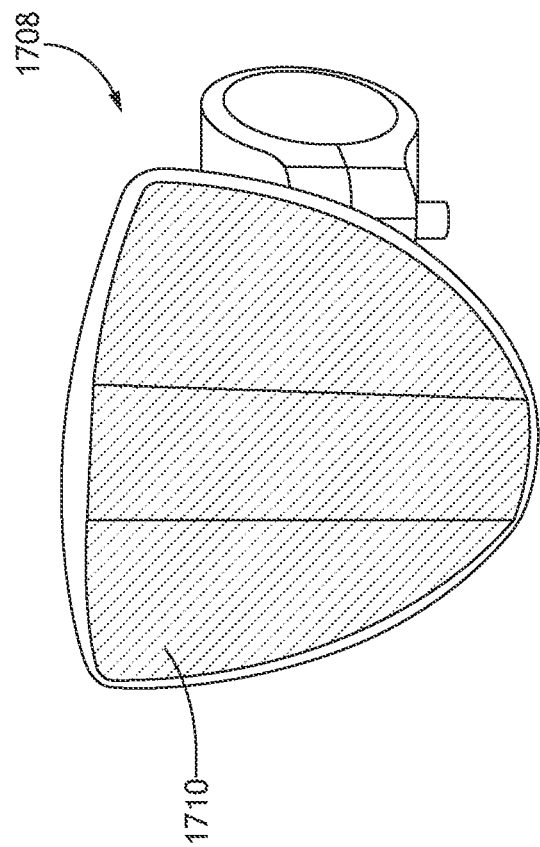
FIG. 17 is a perspective view schematic drawing of a radar reflector for use in the system illustrated in FIG. 1 according to some embodiments.
Figure 16:
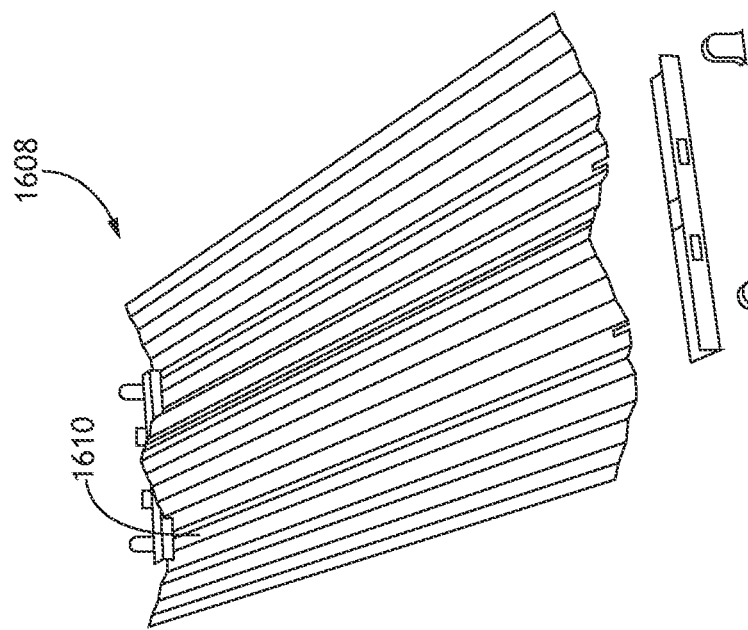
FIG. 16 is a perspective view schematic drawing of a radar reflector for use in the system illustrated in FIG. 1 according to some embodiments.

With reference to FIG. 10, a radar reflector 1008 similar to radar reflector 108 (FIG. 1) includes a set of spherical surfaces 1010. With reference to FIG. 11, a radar reflector 1108 similar to radar reflector 108 (FIG. 1) includes a set of flat surfaces 1110. With reference to FIG. 12, a radar reflector 1208 similar to radar reflector 108 (FIG. 1) includes a set of flat surfaces 1210. With reference to FIG. 13, a radar reflector 1308 similar to radar reflector 108 (FIG. 1) includes a set of flat surfaces 1310. With reference to FIG. 14, a radar reflector 1408 similar to radar reflector 108 (FIG. 1) includes a set of flat surfaces 1410. With reference to FIG. 15, a radar reflector 1508 similar to radar reflector 108 (FIG. 1) includes a set of concave surfaces 1510. With reference to FIG. 16, a radar reflector 1608 similar to radar reflector 108 (FIG. 1) includes a set of flat surfaces 1610. Surfaces 1610 can be partially silvered to provide a diminished level of return. With reference to FIG. 17, a radar reflector 1708 similar to radar reflector 108 (FIG. 1) includes a set of flat surfaces 1710. Flat surfaces 1710 can include corner surfaces and be faceted at angles with respect to each other in some embodiments.

Flat surfaces 1210, 1310, 1410, 1610, and 1710 are angled and/or shaped for providing differently shaped returns from a uniform illuminating beam in some embodiments. The angles and shapes can match airfield features that have angular dependency (PAPI, VASI, or ALS features) in some embodiments. Spherical surfaces 1010 and concave surfaces 1510 are arranged and/or shaped for providing differently shaped returns from a uniform illuminating beam in some embodiments. Surfaces 1010, 1210, 1310, 1410, 1510, 1610, and 1710 can be silvered or partially silvered. Partially silvered surfaces and lower bead densities (for surfaces 1010) can be used for partial returns.

In some embodiments, reflectors 1008, 1108, 1208, 1308, 1408, 1508, 1608, and 1708 are arranged in a set of twelve reflectors. The set can be arranged such that the set returns a full signal for two reflectors and a diminished signal for two reflectors (e.g., to indicate two red symbols and two white symbols for PAPI/VASI indications) when radar system 802 is within the glide scope. The set can also be arranged such that the set returns four full signals when radar system 802 is below the glide scope (e.g., four reflectors could be aimed low to indicate red symbols for PAPI/VASI indications symbolizing a danger condition). The set can also be arranged to return four diminished signals when radar system 802 is above the glide scope (e.g., partial reflectors could be aimed low to indicate white symbols for PAPI/VASI indications).

Inexpensive reflectors can use silvered plastic beads of appropriate shape (e.g. conical section) embedded in a plastic sheet. In some embodiments, twenty five percent of the sheet area with beads provides a partial reflector, while one hundred percent of sheet area with beads provides a full reflector.

In some embodiments, the weather radar system 802 may operate in a weather sense mode until approach or landing. During approach or landing, the weather radar system 802 alternatively performs radar data gathering for sensing of the external surroundings, radar data gathering for weather sensing, and radar data gathering for wind shear detection. In some embodiments, during approach or landing, the weather radar system 802 alternatively performs radar data gathering for sensing of external surroundings including radar reflectors 108, and radar data gathering for wind shear detection or other hazard detection. During approach or landing, weather radar system 802 alternatively performs radar data gathering for sensing of external surroundings, and radar data gathering for weather sensing in some embodiments. In some embodiments, weather sensing operations are suspended during approach and landing.

The scope of this disclosure should be determined by the claims, their legal equivalents and the fact that it fully encompasses other embodiments which may become apparent to those skilled in the art. All structural, electrical and functional equivalents to the elements of the above-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

Embodiments of the inventive concepts disclosed herein have been described with reference to drawings. The drawings illustrate certain details of specific embodiments that implement the systems and methods and programs of the present disclosure. However, describing the embodiments with drawings should not be construed as imposing any limitations that may be present in the drawings. The present disclosure contemplates methods, systems and program products on any machine-readable media for accomplishing its operations. Embodiments of the inventive concepts disclosed herein may be implemented using an existing computer processor, or by a special purpose computer processor incorporated for this or another purpose or by a hardwired system.

As noted above, embodiments within the scope of the inventive concepts disclosed herein include program products comprising non-transitory machine-readable media for carrying or having machine-executable instructions or data structures stored thereon. Such machine-readable media may be any available media that may be accessed by a computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a computer or other machine with a processor. Thus, any such a connection is properly termed a machine-readable medium. Combinations of the above are also included within the scope of machine-readable media. Machine-executable instructions comprise, for example, instructions and data which cause processor to perform a certain function or group of functions.

Embodiments in the inventive concepts disclosed herein have been described in the general context of method steps which may be implemented in one embodiment by a program product including machine-executable instructions, such as program code, for example in the form of program components executed by machines in networked environments. Generally, program components include routines, programs, objects, components, data structures, etc. that perform particular tasks or implement particular abstract data types. Machine-executable instructions, associated data structures, and program components represent examples of program code for executing steps of the methods disclosed herein. The particular sequence of such executable instructions or associated data structures represent examples of corresponding acts for implementing the functions described in such steps.

As previously indicated, embodiments in the present disclosure may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments in the disclosure may also be practiced in distributed computing environments where tasks are performed by local and remote processing devices that are linked (either by hardwired links, wireless links, or by a combination of hardwired or wireless links) through a communications network. In a distributed computing environment, program components may be located in both local and remote memory storage devices.

The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program components and other data for the computer. User interfaces, as described herein, may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure.

The foregoing description of embodiments has been presented for purposes of illustration and description. It is not intended to be exhaustive or to limit the subject matter to the precise form disclosed, and modifications and variations are possible in light of the above teachings or may be acquired from practice of the subject matter disclosed herein. The embodiments were chosen and described in order to explain the principals of the disclosed subject matter and its practical application to enable one skilled in the art to utilize the disclosed subject matter in various embodiments and with various modifications as are suited to the particular use contemplated. Other substitutions, modifications, changes and omissions may be made in the design, operating conditions and arrangement of the embodiments without departing from the scope of the presently disclosed subject matter.

While the exemplary embodiments illustrated in the figures and described above are presently preferred, it should be understood that these embodiments are offered by way of example only. Other embodiments may include, for example, structures with different data mapping or different data. The disclosed subject matter is not limited to a particular embodiment, but extends to various modifications, combinations, and permutations that nevertheless fall within the scope and spirit of the appended claims.

What is claimed is:

1. An apparatus comprising:
   a set of radar reflectors, wherein each of the radar reflectors comprises;
   a first interface configured to be attached to a light stanchion in a fixed fashion;
   a second interface configured to be attached to a light in a fixed fashion; and
   a radar reflective member configured to provide a radar return in response to a radar beam from a radar system of an airplane, the radar reflective member including a shape or an orientation such that the radar return includes a power level with a magnitude corresponding to an angular direction of the radar beam striking the radar reflective member, the angular direction of the radar beam corresponding to a glide slope of the airplane;
   wherein the set of radar reflectors are arranged such that the radar returns from the radar reflective members of the set of radar reflectors provide for visual approach slope indications or precision approach path indications based on the power level of the radar return such that a below glide slope condition or an above glide slope condition is indicated by the radar return, wherein the visual approach slope indications or precision approach path indications are in a pattern, the pattern including at least four received radar returns when the airplane is in the below glide slope condition, the pattern including at least four received radar returns when the airplane is in the above glide slope condition, wherein the at least four received radar returns when the airplane is in the below glide slope condition include a power level greater than the at least four received radar returns when the airplane is in the above glide slope condition.

2. The apparatus of claim 1, wherein the first interface and the second interface are disposed on a collar, the first interface having a first radius configured to overlap the light stanchion, the second interface having a second radius configured to be overlapped by a light interface of the light.

3. The apparatus of claim 1, wherein the light stanchion is part of an approach light system.

4. The apparatus of claim 1, the pattern including at least four received radar returns when the airplane is between the below glide slope condition and the above glide slope condition, wherein the at least four received radar returns when the airplane is between the below glide slope condition and the above glide slope condition include at least two received radar returns at a first power level, and at least two additional received radar returns at a second power level, wherein the first power level is greater than the second power level.

5. The apparatus of claim 1, wherein the radar reflective member comprises a corner reflector.

6. The apparatus of claim 1, wherein the radar reflective member comprises a plurality of corner reflectors.

7. The apparatus of claim 1, wherein the radar reflective member is arranged to provide an approach landing system response.

8. The apparatus of claim 1, wherein the below glide slope condition occurs when the glide slope of the airplane is at 2.5 degrees or less, wherein the above glide slope condition occurs when the glide slope of the airplane is at 3.5 degrees or greater.

9. The apparatus of claim 1, wherein the apparatus is comprised of at least two attachable pieces configured so that the two attachable pieces can be attached around existing wiring without rewiring the light stanchion.

10. A runway lighting system, comprising:
    a plurality of radar reflectors each including a radar reflective member, the radar reflective member configured to provide a radar return in response to a radar beam from a radar system of an airplane, the radar reflective member including a shape or an orientation such that the radar return includes a power level with a magnitude corresponding to an angular direction of the radar beam striking the radar reflective member, with the angular direction of the radar beam corresponding to a glide slope of the airplane,
    wherein the plurality of radar reflectors are arranged such that the radar reflective member of each of the plurality of radar reflectors provide for visual approach slope indications or precision approach path indications based on the power level of the radar return such that a below glide slope condition or an above glide slope condition is indicated by the radar return, wherein the-visual approach slope indications or precision approach path indications are in a pattern associated with a visual approach slope indication or precision approach path indication light pattern, the pattern including at least four received radar returns when the airplane is in the below glide slope condition, the pattern including at least four received radar returns when the airplane is in the above glide slope condition, wherein the at least four received radar returns when the airplane is in the below glide slope condition include a power level greater than the at least four received radar returns when the airplane is in the above glide slope condition.

11. The runway lighting system of claim 10, wherein the radar reflectors are attached to runway lights or are stand alone and are conical reflectors.

12. The runway lighting system of claim 10, wherein the radar reflectors are attached to runway light stanchions.

13. The runway lighting system of claim 10, wherein at least one of the radar reflectors is provided on a collar disposed between a runway light stanchion and a runway light.

* * * * *